United States Patent
Klipper et al.

(10) Patent No.: US 10,016,754 B2
(45) Date of Patent: Jul. 10, 2018

(54) METHOD FOR PRODUCING AMINO METHYLATED BEAD POLYMERIZATES FROM N-CARBOXYLIC ACID METHYLPHTHALIMIDE ESTERS

(71) Applicant: LANXESS Deutschland GmbH, Cologne (DE)

(72) Inventors: Reinhold Klipper, Cologne (DE); Pierre Vanhoorne, Monheim (DE); Bernd Koop, Cologne (DE); Areski Rezkallah, Bergisch Gladbach (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 15/536,685

(22) PCT Filed: Dec. 21, 2015

(86) PCT No.: PCT/EP2015/080826
§ 371 (c)(1),
(2) Date: Jun. 16, 2017

(87) PCT Pub. No.: WO2016/102487
PCT Pub. Date: Jun. 30, 2016

(65) Prior Publication Data
US 2017/0348684 A1 Dec. 7, 2017

(30) Foreign Application Priority Data
Dec. 22, 2014 (EP) .................... 14199636

(51) Int. Cl.
*B01J 45/00* (2006.01)
*C08F 8/30* (2006.01)
*C08F 8/12* (2006.01)
*C08F 212/14* (2006.01)
*C08F 212/08* (2006.01)
*B01J 41/13* (2017.01)

(52) U.S. Cl.
CPC .............. *B01J 41/13* (2017.01); *B01J 45/00* (2013.01); *C08F 8/12* (2013.01); *C08F 8/30* (2013.01); *C08F 212/08* (2013.01); *C08F 212/14* (2013.01)

(58) Field of Classification Search
CPC .......... B01J 41/13; B01J 45/00; C08F 212/08; C08F 212/14; C08F 8/12; C08F 8/30
USPC ....................................... 526/293
See application file for complete search history.

(56) References Cited

U.S. PATENT DOCUMENTS

| | | | |
|---|---|---|---|
| 3,925,264 A | 12/1975 | Corte et al. | |
| 3,989,650 A | 11/1976 | Lange et al. | |
| 4,382,124 A | 5/1983 | Meitzner et al. | |
| 4,419,245 A | 12/1983 | Barrett et al. | |
| 4,427,794 A | 1/1984 | Lange et al. | |
| 4,444,961 A | 4/1984 | Timm | |
| 4,952,608 A | 8/1990 | Klipper et al. | |
| 5,231,115 A | 7/1993 | Harris | |
| 7,053,129 B1 | 5/2006 | Klipper et al. | |
| 2006/0199892 A1* | 9/2006 | Podszun | B01J 39/20 524/458 |

OTHER PUBLICATIONS

European Search Report from European Application No. 14199636, dated May 27, 2015, two pages.

\* cited by examiner

*Primary Examiner* — Monique Peets

(57) ABSTRACT

The invention relates to a process for preparing aminomethylated bead polymers from N-carboxymethylphthalimides, which are used as anion exchangers or can be converted further to chelate resins.

15 Claims, No Drawings

METHOD FOR PRODUCING AMINO METHYLATED BEAD POLYMERIZATES FROM N-CARBOXYLIC ACID METHYLPHTHALIMIDE ESTERS

The invention relates to a process for preparing aminomethylated bead polymers from N-carboxymethylphthalimides, which are used as anion exchangers or can be converted further to chelate resins.

DE-A 3733033, U.S. Pat. No. 7,053,129 or U.S. Pat. No. 3,925,264 discloses a process for preparing aminomethylated bead polymers, in which phthalimide is converted in the presence of formaldehyde and in the presence of bases and swelling agents, especially in 1,2-dichloroethane, to N-hydroxymethylphthalimide, which is converted in a further step by acid catalysis to bis(phthalimidomethyl) ether. This ether is reacted in the presence of Friedel-Crafts catalysts, especially in the presence of strong acids, with the bead polymer to give the phthalimidomethylated bead polymer. The phthalimidomethylated bead polymer is then hydrolysed under alkaline conditions to give the aminomethylated bead polymer.

U.S. Pat. No. 3,989,650 discloses a process for preparing aminomethylated bead polymers, in which N-hydroxyalkylimides or N-hydroxyalkylamides are reacted with aliphatic carboxylic acids and carboxylic anhydrides to give their esters and then the bead polymer is amidomethylated in the presence of a swelling agent and a Friedel-Crafts catalyst. The amidomethylated bead polymer is then hydrolysed under alkaline conditions to give the aminomethylated bead polymer.

A disadvantage of the aforementioned processes is that the yields are unsatisfactory.

There was therefore a need for a process in which aminomethylated bead polymers can be prepared with high yields.

It has been found that, surprisingly, high yields of aminomethylated bead polymers can be achieved in the presence of aliphatic saturated or unsaturated carboxylic anhydrides or carboxylic acids or in the presence of mixtures of these carboxylic anhydrides and at least one aliphatic saturated or unsaturated carboxylic acid. At the same time, it is possible to very substantially dispense with the use of chlorinated organic solvents.

The invention therefore provides a process for preparing aminomethylated bead polymers in which
a) monomer droplets composed of a mixture comprising at least one monovinylaromatic compound, at least one polyvinylaromatic compound and at least one initiator are converted to a bead polymer and
b) the bead polymer from step a) is reacted with N-carboxymethylphthalimide
  in the presence of aliphatic saturated or unsaturated carboxylic anhydrides or carboxylic acids or in the presence of mixtures of aliphatic saturated or unsaturated carboxylic anhydrides and at least one aliphatic saturated or unsaturated carboxylic acid, and
  in the presence of at least one Friedel-Crafts catalyst,
  to give a phthalimidomethylated bead polymer, and the amount of the compounds used:
  N-carboxymethylphthalimide, bead polymer, aliphatic, saturated or unsaturated carboxylic anhydrides or carboxylic acids and Friedel-Crafts catalysts collectively in the reaction mixture is greater than 80% by weight, based on the total amount of the reaction mixture, and
c) the phthalimidomethylated bead polymer is hydrolysed to give an aminomethylated bead polymer.

The scope of the invention encompasses all radical definitions, parameters and elucidations above and detailed hereinafter, in general terms or mentioned within areas of preference, together with one another, i.e. including any combination between the respective areas and areas of preference.

At least one monovinylaromatic compound and at least one polyvinylaromatic compound are employed in process step a). However, it is also possible to use mixtures of two or more monovinylaromatic compounds and mixtures of two or more polyvinylaromatic compounds.

In the context of the present invention, monovinylaromatic compounds used in process step a) are preferably styrene, vinyltoluene, ethylstyrene, α-methylstyrene, chlorostyrene, or chloromethylstyrene.

Especially preferably, styrene is used, or mixtures of styrene with the aforementioned monomers, preferably with ethylstyrene, are used.

Preferred polyvinylaromatic compounds in the context of the present invention for process step a) are divinylbenzene, divinyltoluene, trivinylbenzene, divinylnaphthalene, trivinylnaphthalene, especially preferably divinylbenzene.

The polyvinylaromatic compounds are preferably used in amounts of 1%-20% by weight, more preferably 2%-12% by weight, especially preferably 4%-10% by weight, based on the monomer or mixture thereof with other monomers. The type of polyvinylaromatic compound (crosslinker) is selected with a view to the later use of the bead polymer. In the case of use of divinylbenzene, commercial grades of divinylbenzene also comprising ethylvinylbenzene as well as the isomers of divinylbenzene are sufficient.

The term "bead polymer" for the purposes of the invention is a crosslinked polymer in bead form.

The term "microporous" or "in gel form"/"macroporous" have already been described in detail in the technical literature.

Macroporous bead polymers are preferably formed by addition of inert materials, preferably at least one porogen, to the monomer mixture in the course of polymerization, in order to produce a macroporous structure in the bead polymer. Especially preferred porogens are hexane, octane, isooctane, isododecane, methyl ethyl ketone, butanol or octanol and isomers thereof. Particularly suitable organic substances are those which dissolve in the monomer but are poor solvents or swellants for the bead polymer (precipitants for polymers), for example aliphatic hydrocarbons (Farbenfabriken Bayer DBP 1045102, 1957; DBP 1113570, 1957).

U.S. Pat. No. 4,382,124 uses, as a porogen, alcohols having 4 to 10 carbon atoms, which are likewise to be used with preference in the context of the present invention, for preparation of monodisperse, macroporous bead polymers based on styrene/divinylbenzene. In addition, an overview of the preparation methods for macroporous bead polymers is given.

It is preferable when at least one porogen is added in process step a). Preferably, the aminomethylated bead polymers have a macroporous structure.

The bead polymers prepared according to process step a) can be prepared in heterodisperse or monodisperse form.

The production of heterodisperse bead polymers is accomplished by general methods known to those skilled in the art, for example with the aid of suspension polymerization.

Preference is given to preparing monodisperse bead polymers in process step a).

In the present application, monodisperse materials are those in which at least 90% by volume or % by mass of the particles have a diameter within the range of ±10% of the most common diameter.

For example, in the case of a substance having the most common diameter of 0.5 mm, at least 90% by volume or by mass is within a size interval between 0.45 mm and 0.55 mm; in the case of a substance having the most common diameter of 0.7 mm, at least 90% by volume or by mass is within a size interval between 0.77 mm and 0.63 mm.

In a preferred embodiment of the present invention, microencapsulated monomer droplets are used in the preparation of monodisperse bead polymers in process step a).

Useful materials for microencapsulation of the monomer droplets are those known for use as complex coacervates, especially polyesters, natural and synthetic polyamides, polyurethanes or polyureas.

A natural polyamide used is preferably gelatin. This is employed especially as a coacervate and complex coacervate. Gelatin-containing complex coacervates in the context of the invention are particularly understood to mean combinations of gelatin with synthetic polyelectrolytes. Suitable synthetic polyelectrolytes are copolymers having incorporated units of, for example, maleic acid, acrylic acid, methacrylic acid, acrylamide and methacrylamide. Particular preference is given to using acrylic acid and acrylamide. Gelatin-containing capsules can be hardened with conventional hardeners, for example formaldehyde or glutaraldehyde. The encapsulation of monomer droplets with gelatin, gelatin-containing coacervates and gelatin-containing complex coacervates is described in detail in EP-A 0 046 535. The methods of encapsulation with synthetic polymers are known. Preference is given to an interfacial condensation in which a reactive component (especially an isocyanate or an acid chloride) dissolved in the monomer droplet is reacted with a second reactive component (especially an amine) dissolved in the aqueous phase.

The heterodisperse or optionally microencapsulated monodisperse monomer droplets contain at least one initiator or mixtures of initiators (initiator combination) to trigger the polymerization. Initiators preferred for the process according to the invention are peroxy compounds, especially preferably dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds such as 2,2'-azobis(isobutyronitrile) or 2,2'-azobis(2-methyisobutyronitrile).

The initiators are preferably employed in amounts of 0.05% to 2.5% by weight, more preferably 0.1% to 1.5% by weight, based on the monomer mixture.

The optionally monodisperse microencapsulated monomer droplet may optionally also contain up to 30% by weight (based on the monomer) of crosslinked or uncrosslinked polymer. Preferred polymers derive from the aforementioned monomers, more preferably from styrene.

In the preparation of monodisperse bead polymers in process step a), the aqueous phase, in a further preferred embodiment, may comprise a dissolved polymerization inhibitor. Useful inhibitors in this case include both inorganic and organic substances. Preferred inorganic inhibitors are nitrogen compounds, especially preferably hydroxylamine, hydrazine, sodium nitrite and potassium nitrite, salts of phosphorous acid such as sodium hydrogen phosphite, and sulphur compounds such as sodium dithionite, sodium thiosulphate, sodium sulphite, sodium bisulphite, sodium thiocyanate and ammonium thiocyanate. Examples of organic inhibitors are phenolic compounds such as hydroquinone, hydroquinone monomethyl ether, resorcinol, catechol, tert-butylcatechol, pyrogallol and condensation products of phenols with aldehydes. Further preferred organic inhibitors are nitrogen compounds. Especially preferred are hydroxylamine derivatives, for example N,N-diethylhydroxylamine, N-isopropylhydroxylamine and sulphonated or carboxylated N-alkylhydroxylamine or N,N-dialkylhydroxylamine derivatives, hydrazine derivatives, for example N,N-hydrazinodiacetic acid, nitroso compounds, for example N-nitrosophenylhydroxylamine, N-nitrosophenylhydroxylamine ammonium salt or N-nitrosophenylhydroxylamine aluminium salt.

The concentration of the inhibitor is 5-1000 ppm (based on the aqueous phase), preferably 10-500 ppm, more preferably 10-250 ppm.

The polymerization of the optionally microencapsulated, monodisperse monomer droplets to give the monodisperse bead polymer, as already mentioned above, is optionally or preferably effected in the presence of one or more protective colloids in the aqueous phase. Suitable protective colloids are natural or synthetic water-soluble polymers, preferably gelatin, starch, polyvinyl alcohol, polyvinylpyrrolidone, polyacrylic acid, polymethacrylic acid or copolymers of (meth)acrylic acid and (meth)acrylic esters. Preference is further given to cellulose derivatives, especially cellulose esters and cellulose ethers, such as carboxymethyl cellulose, methyl hydroxyethyl cellulose, methyl hydroxypropyl cellulose and hydroxyethyl cellulose. Gelatin is especially preferred. The use amount of the protective colloids is generally 0.05% to 1% by weight, based on the aqueous phase, preferably 0.05% to 0.5% by weight.

The polymerization to give the monodisperse bead polymer, in an alternative preferred embodiment, can be conducted in the presence of a buffer system. Preference is given to buffer systems which adjust the pH of the aqueous phase at the start of the polymerization to a value between 14 and 6, preferably between 12 and 8. Under these conditions, protective colloids having carboxylic acid groups are wholly or partly in the form of salts. This causes a favourable effect on the action of the protective colloids. Particularly highly suitable buffer systems contain phosphate or borate salts. The terms "phosphate" and "borate" in the context of the invention also include the condensation products of the ortho forms of corresponding acids and salts. The concentration of the phosphate or borate in the aqueous phase is, for example, 0.5-500 mmol/l and preferably 2.5-100 mmol/l.

The stirrer speed in the polymerization to give the monodisperse bead polymer is comparatively uncritical and, in contrast with conventional bead polymerization, has no effect on the particle size. Low stirrer speeds are employed, which are sufficient to keep the suspended monomer droplets in suspended form and to promote the removal of the heat of polymerization. Various stirrer types can be used for this task. Particularly suitable stirrers are gate stirrers with axial action.

The volume ratio of encapsulated monomer droplets to aqueous phase is generally 1:0.75 to 120, preferably 1:1 to 1:6.

The polymerization temperature to give the monodisperse bead polymer is guided by the decomposition temperature of the initiator used. It is generally between 50 to 180° C., preferably between 55 and 130° C. The polymerization generally takes 0.5 to about 20 hours. It has been found to be useful to employ a temperature program in which the polymerization is commenced at low temperature, for example 60° C., and the reaction temperature is raised with increasing polymerization conversion. In this way, for example, the demand for reliable running of the reaction and a high polymerization conversion can be fulfilled very efficiently. After the polymerization, the monodisperse bead polymer is isolated by conventional methods, for example by filtering or decanting, and optionally washed.

The preparation of the monodisperse bead polymers with the aid of the jetting principle or the seed-feed principle is known from the prior art and described, for example, in U.S. Pat. No. 4,444,961, EP-A 0 046 535, U.S. Pat. No. 4,419,245 or WO 93/12167.

Preference is given to preparing the monodisperse bead polymers with the aid of the jetting principle or the seed-feed principle.

Preference is given to preparing, in process step a), a macroporous, monodisperse bead polymer.

Carboxylic anhydrides used in process step b) may, for example and with preference, be aliphatic saturated or unsaturated mono-, di- or tricarboxylic anhydrides that are liquid at temperatures between 10° C. and 60° C., for example succinic anhydride, oxalic anhydride, adipic anhydride, maleic anhydride, acetic anhydride, butyric anhydride, propionic anhydride, hexanoic anhydride or pentanoic anhydride and the isomers thereof, for example valeric anhydride, isovaleric anhydride, 2-methylbutyric anhydride or pivalic anhydride. Carboxylic anhydrides used in process step b) are more preferably aliphatic and saturated monocarboxylic anhydrides that are liquid at temperatures between 10° C. and 60° C. Very particular preference is given to using acetic anhydride or pentanoic anhydride and the valeric anhydride, isovaleric anhydride, 2-methylbutyric anhydride or pivalic anhydride isomers thereof. Even further preferably, acetic anhydride is used.

Carboxylic acids used in process step b) may, for example and with preference, be liquid saturated or unsaturated mono-, dl- or tricarboxylic acids that are liquid at temperatures between 10° C. and 60° C., for example succinic acid, oxalic acid, adipic acid, formic acid, diglycolic acid, maleic acid, acetic acid, butyric acid, propanoic acid, hexanoic acid or heptanoic acid. Preference is given to using carboxylic acids or mixtures of carboxylic anhydrides and the corresponding carboxylic acids, i.e., for example, valeric anhydride with valeric acid or acetic anhydride with acetic acid. More preferably, carboxylic acids used in process step b) are aliphatic unsaturated monocarboxylic acids that are liquid at temperatures between 10° C. and 60° C. Very particular preference is given to using acetic acid or acetic anhydride with acetic acid as a mixture. If mixtures of carboxylic anhydride and carboxylic acid are used, the ratio of carboxylic anhydride to carboxylic acid is generally between 100:1 and 1:100. Preferably, the ratio between carboxylic anhydride and carboxylic acid is between 100:1 and 1:1. More preferably, the ratio between carboxylic anhydride and carboxylic acid is between 10:1 and 1:10. Even further preferably, the ratio between carboxylic anhydride and carboxylic acid is between 10:1 and 3:1.

Friedel-Crafts catalysts used in process step b) may preferably be strong inorganic or organic protic acids or Lewis acids, for example zinc chloride, aluminium chloride, tin tetrachloride, iron(II) chloride or further iron(II) salts or mixtures of these compounds. Friedel-Crafts catalysts used are, for example and with preference, aliphatic or aromatic methane-, benzene- and toluenesulphonic acids, hydrochloric acid, sulphuric acid, oleum, nitric acid or phosphoric acid or mixtures of these acids. Organic protic acids used may, for example, be aliphatic or aromatic methane-, benzene- and toluenesulphonic acids or fluorosulphonic acid. Friedel-Crafts catalysts used are preferably sulphuric acid, oleum and iron(III) salts or mixtures of these compounds. Friedel-Crafts catalysts used are more preferably sulphuric acid and iron(III) chloride and mixtures of these compounds.

Preference is given to using sulphuric acid relative to the iron(II) salts in process step b) in a molar ratio of 3:1 to 1:3. Particular preference is given to using sulphuric acid relative to iron(III) chloride in process step b) in a molar ratio of 1:1 to 1:3.

N-Carboxymethylphthalimides used in process step b) may be any esters which can form in the esterification of N-hydroxymethylphthalimide with aliphatic, saturated or unsaturated carboxylic anhydrides or aliphatic, saturated or unsaturated carboxylic acids and the mixtures of aliphatic, saturated or unsaturated carboxylic anhydrides and aliphatic, saturated or unsaturated carboxylic acids. N-Carboxymethylphthalimides are preferred compounds of the formula (I)

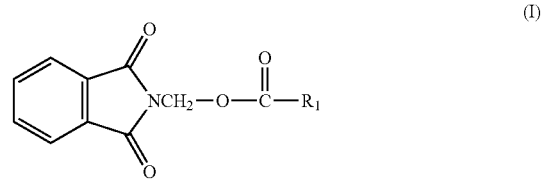

where $R_1$ represents linear or branched $C_1$-$C_6$-alkyl and $C_2$-$C_5$-alkenyl radicals which may optionally be substituted by further carboxyl groups. Preferably, $R_1$ is linear or branched $C_1$-$C_6$-alkyl.

N-Carboxymethylphthalimides used may more preferably be N-acetoxymethylphthalimide, N-propionoxymethylphthalimide and butyroxy-N-methylphthalimide. Most preferably, the N-carboxymethylphthalimide used is N-acetoxymethylphthalimide. The preparation of the N-carboxymethylphthalimides is additionally known, for example, from U.S. Pat. No. 3,989,650. N-Hydroxymethylphthalimide can, for example and with preference, be prepared by reacting phthalimide with formaldehyde in the presence of bases and can then be esterified in the presence of carboxylic anhydrides or/and carboxylic acids, optionally in the presence of further inorganic or organic catalytic protic acids, to give the N-carboxymethylphthalimide.

The N-carboxymethylphthalimide can, for example, first be prepared from N-hydroxymethylphthalimide and carboxylic anhydride or carboxylic acids or mixtures of carboxylic anhydride and carboxylic acids and isolated, and then used in process step b). It is likewise possible, however, to prepare the N-carboxymethylphthalimide in situ, for example, from N-hydroxymethylphthalimide and carboxylic anhydrides or carboxylic acids or mixtures of carboxylic anhydrides and carboxylic acids, optionally in the presence of a further protic acid, and to use it without further isolation in process step b). It is likewise possible that the protic acid could also itself be a carboxylic acid and for the addition of a further protic acid to be dispensed with, or that the carboxylic acid is optionally mixed with a catalytic amount of another strong protic acids and for it to serve for catalytic esterification of the N-hydroxymethylphthalimide with the carboxylic anhydrides or/and the carboxylic acid to give the N-carboxymethylphthalimide.

Protic acids used for preparation of the N-carboxymethylphthalimide may, for example, be inorganic or organic protic acids. Inorganic protic acids used for preparation of the N-carboxymethylphthalimide are, for example, hydrochloric acid, sulphuric acid, oleum, nitric acid, nitrous acid, sulphurous acid or phosphoric acid. Organic protic acids used for preparation of the N-carboxymethylphthalimide may, for example, be acetic acid, propionic acid, oxalic acid or formic acid. Preference is given to using inorganic protic acids for preparation of the N-carboxymethylphthalimide. Protic acids used with particular preference for preparation of the N-carboxymethylphthalimide are sulphuric acid, hydrochloric acid or oleum. A protic acid used with even further preference for the preparation of N-carboxymethylphthalimide is sulphuric acid.

Preference is given to reacting N-hydroxymethylphthalimide with carboxylic anhydrides or mixtures of carboxylic anhydrides and carboxylic acids in the presence of a protic acid to give the N-carboxymethylphthalimide.

Process step b) can be conducted in different ways. The N-carboxymethylphthalimide can be isolated and then contacted, for example, with the bead polymer. It would also be equally possible to produce and use the N-carboxymethylphthalimde in situ. Catalysts used for coupling of the N-carboxymethylphthalimide with the bead polymer are Friedel-Crafts catalysts. Preference is given to using sulphuric acid as Friedel-Crafts catalyst. Particular preference is given to using sulphuric acid in a mixture with iron(III) chloride. Once the reaction in process step b) has ended, workup is effected with the aid of known methods. In general, on completion of the reaction, an aqueous solution is introduced for neutralization and the phthalimidomethylated bead polymer is then filtered off. However, the workup can also be effected differently.

However, process step b) can also be effected in such a way that phthalimide is reacted directly with gaseous formaldehyde in the presence of the bead polymer and in the presence of the carboxylic anhydride or the carboxylic acids or the mixtures of carboxylic anhydrides and the carboxylic acids and the Friedel-Crafts catalyst, in a one-pot reaction, to give the phthalimidomethylated bead polymer. Here too, the N-carboxymethylphthalimide is formed as an intermediate. Once the reaction has ended, workup is effected with the aid of known methods. In general, on completion of the reaction, an aqueous salt solution is introduced for neutralization and the resin is then filtered off. However, the workup can also be effected differently.

Preferably, process step b) is effected by preparing the N-carboxymethylphthalimide separately and then reacting it with the bead polymer in the presence of the Friedel-Crafts catalyst, the carboxylic anhydride or the carboxylic acids or the mixtures of carboxylic anhydrides and the carboxylic acids to give the phthalimidomethylated bead polymer. For this purpose, first of all, the N-hydroxymethylphthalimide is preferably converted in the presence of a protic acid to the N-carboxymethylphthalimide and contacted with the bead polymer without further removal of the reaction solution. Preferably, the mixture is then heated. Preferably, sulphuric acid is then added by metered addition. Thereafter, the iron(III) chloride is preferably added. The mixture is preferably reheated. The workup is preferably effected by adding demineralized water and filtering the phthalimidomethylated bead polymer.

The amount of N-carboxymethylphthalimide which is used in process step b) is generally 2 to 20 mol of N-carboxymethylphthalimide per mole of Friedel-Crafts catalyst, but may also be smaller or larger. Preference is given to using 2 to 5 mol of N-carboxymethylphthalimide per mole of Friedel-Crafts catalyst.

The amount of N-carboxymethylphthalimide which is used in process step b) is generally $10^{-3}$ to 1 mol of N-carboxymethylphthalimide per gram of bead polymer, but may also be greater or smaller. Preference is given to using $10^{-3}$ mol to 0.03 mol of N-carboxymethylphthalimide per gram of bead polymer.

The amount of carboxylic anhydrides or carboxylic acids or mixtures of carboxylic anhydrides and carboxylic acids which is used in process step b) is generally 1 to 20 mol of carboxylic anhydrides or carboxylic acids or carboxylic anhydrides and carboxylic acids per mole of N-carboxymethylphthalimide, but may also be smaller or greater. Preference is given to using 1 to 10 mol of carboxylic anhydrides or carboxylic acids or mixtures of carboxylic anhydrides and carboxylic acids per mole of N-carboxymethylphthalimide. Particular preference is given to using 1.6 to 2.5 mol of carboxylic anhydrides or carboxylic acids or mixtures of carboxylic anhydrides and carboxylic acids per mole of N-carboxymethylphthalimide.

Preferably, the content of swelling agents in process step b) is less than 10% by weight based on the total amount of reactants used; even further preferably, the content of swelling agents is less than 5% by weight, based on the total amount of the reactants. Process step b) is more preferably conducted without addition of swelling agents. Standard swelling agents are organic solvents, for example dichloromethane, dichloroethane, especially 1,2-dichloroethane, tetrachloroethane, dichloropropane, pentachloropropane, dimethylformamide, sulpholanes, nitropropanes or nitrobenzene. Even further preferably, process step b.) is conducted in the absence of 1,2-dichloroethane.

Preferably, the temperature at which process step b) is conducted is between 100° C. and 150° C.

Preferably, the N-carboxymethylphthalimide, bead polymer, carboxylic anhydride, carboxylic acid and Friedel-Crafts catalyst compounds used in process step b) are present collectively in an amount greater than 90% by weight in the reaction mixture, based on the total amount of the reaction mixture.

More preferably, the N-carboxymethylphthalimide, bead polymer, carboxylic anhydride, carboxylic acid and Friedel-Crafts catalyst compounds used in process step b) are present collectively in an amount greater than 95% by weight in the reaction mixture, based on the total amount of the reaction mixture.

In process step b), preferably carboxylic acids or carboxylic anhydrides are used. In process step b), it is also possible to use mixtures consisting of the compounds of the formula (I), bead polymer, aliphatic, saturated or unsaturated carboxylic anhydrides and Friedel-Crafts catalysts, and to use them without additional addition of carboxylic acids. In this case, it is likewise true that the total amount of the compounds of the formula (I), the bead polymer, the aliphatic, saturated or unsaturated carboxylic anhydrides and Friedel-Crafts catalysts used is preferably greater than 80% by weight, more preferably greater than 90% by weight and most preferably greater than 95% by weight in the reaction mixture, based on the total amount of the reaction mixture.

In process step b), preference is also given to using mixtures consisting of the compounds of the formula (I), bead polymer, aliphatic, saturated or unsaturated carboxylic acids and Friedel-Crafts catalysts. In this case, it is likewise true that the total amount of the compounds of the formula (I), the bead polymer, the aliphatic, saturated or unsaturated carboxylic acids and Friedel-Crafts catalysts used is preferably greater than 80% by weight, more preferably greater than 90% by weight and most preferably greater than 95% by weight in the reaction mixture, based on the total amount of the reaction mixture.

In process step c), in general, the conversion of the phthalimidomethylated bead polymer to the aminomethylated bead polymer is effected with aqueous or alcoholic solutions of an alkali metal hydroxide such as sodium hydroxide or potassium hydroxide. In addition, process step c) is generally conducted at temperatures between 1000° C. and 250° C., but may alternatively be conducted at higher or lower temperatures. Preferably, process step c) is conducted at temperatures between 120° C. and 190° C. Preferably, the conversion of the phthalimidomethylated bead polymer to the aminomethylated bead polymer in process step c) is effected with alkali metal or alkaline earth metal hydroxides or mixtures of these compounds, more preferably with alkali metal hydroxides, such as sodium hydroxide in particular. Preferably, the conversion in process step c) proceeds in the presence of an aqueous or alcoholic solution of an alkali metal hydroxide. The concentration of the sodium hydroxide solution is in the range from 10% to 50% by weight, preferably 20% to 40% by weight. The aminomethylated bead polymer formed here is preferably washed with demineralized water to free it of alkali, but can also be treated with other aqueous solutions or non-demineralized water.

The aminomethylated bead polymer can be used as anion exchanger or be converted further to chelate resins.

The conversion of the aminomethylated bead polymers obtained in process step c) to chelate resins is effected by standard processes known to those skilled in the art.

For example, the preparation of chelate resins containing iminodiacetic acid groups can be effected by reacting the bead polymer containing aminomethyl groups from process step c) in aqueous suspension with chloroacetic acid or derivatives thereof. It is likewise possible to react the aminomethylated bead polymers obtained in process step c) in sulphuric acid suspension with formalin in combination with P-H-acidic compounds (via a modified Mannich reaction) to give chelate resins having phosphonic acid groups. With the aid of the process according to the invention, it is possible to prepare aminomethylated bead polymers with high yields, based on the amount of aminomethyl groups introduced. A further advantage of the process is that it is possible to very substantially dispense with the addition of chlorinated organic solvents or swelling agents. It is even possible to entirely dispense with chlorinated organic solvents or swelling agents in process step b.).

The aminomethylated bead polymers prepared in accordance with the invention can be used as weakly basic anion exchangers.

Determination of Amount of Basic Aminomethyl Groups in Aminomethylated Bead Polymer 100 ml of the aminomethylated bead polymer are agitated down in the tamp volumeter and subsequently washed with demineralized water into a glass column. 1000 ml of 2% by weight aqueous sodium hydroxide solution are passed through the column in the course of 1 hour and 40 minutes.

Demineralized water is then passed through until 100 ml of eluate with added phenolphthalein have a consumption of not more than 0.05 ml.

50 ml of the resin are admixed in a beaker with 50 ml of demineralized water and 100 ml of 1 N hydrochloric acid. The suspension is stirred for 30 minutes and then transferred into a glass column. The liquid is drained off. A further 100 ml of 1 N hydrochloric acid are passed through the resin for 20 minutes. 200 ml of methanol are then passed through. All of the eluates are collected and combined and titrated with 1 N sodium hydroxide solution using methyl orange.

The number of aminomethyl groups in 1 liter of aminomethylated bead polymer is calculated by the following formula:

$$(200\ V)*20 = \text{mol of aminomethyl groups per liter of aminomethylated bead polymer.}$$

EXAMPLES

Example 1

1.1 Preparation of the Heterodisperse Macroporous Bead Polymer Based on Styrene, Divinylbenzene and Ethylstyrene Such a heterodisperse bead polymer is used in Example 5 of U.S. Pat. No. 3,989,650.

At room temperature, the reactor is initially charged with 1112 ml of demineralized water. 72 ml of a 2% by weight aqueous Walocel solution are metered into the initial charge. Walocel is a hydroxyethyl methyl cellulose. This solution is prepared by introducing the hydroxyethyl methyl cellulose solid into an initial charge of water while stirring and then stirring for a further 4 hours. After the aqueous Walocel solution has been metered in, the mixture is stirred for a further 30 minutes. Subsequently, 7.5 grams of disodium hydrogenphosphate *12 $H_2O$ are metered in. The mixture is stirred for a further 30 minutes.

With the stirrer stationary, the organic phase consisting of 865.1 grams of styrene, 94.9 grams of 80.95% by weight divinylbenzene, 576 grams of isododecane and 7.68 grams of 75% by weight dibenzoyl peroxide is metered in. The solution had been prepared separately beforehand.

The abovementioned mixture is polymerized to completion with stirring by increasing the temperature in accordance with a temperature programme beginning at 25° C. and ending at 95° C.

The mixture is cooled down, and the suspension is applied to a sieve, washed with demineralized water and dried in a laboratory vacuum cabinet at 80° C. for 48 hours.

Weight yield based on the total amount of monomers used: 957.2 grams 1.2 Preparation of N-Acetoxymethylphthalimide 945.8 grams of acetic anhydride are initially charged at room temperature. 1025.8 grams of N-methylolphthalimide are metered into the initial charge, then 14.2 grams of monosulphuric acid are metered in. The suspension is heated to 80° C. A solution arises, which is stirred at 80° C. for 30 minutes.

1.3 Preparation of a Phthalimidomethylated Heterodisperse Macroporous Bead Polymer At 80° C., 450 grams of the heterodisperse bead polymer from Example 1.1 are metered into the mixture from 1.2 within 2 minutes. The suspension is heated to 120° C. and stirred at this temperature for a further 2 hours. Then the mixture is cooled down to 60° C. 115.9 g of monosulphuric acid are metered in within 2 hours. Then 300.5 g of iron(II) chloride are metered in within 5 minutes. The mixture is stirred at 60° C. for a further hour. The mixture is heated to 115° C. and stirred at this temperature for a further 3.5 hours.

The mixture is cooled down to 80° C. 1500 ml of demineralized water are metered in. The mixture is stirred at 95° C. for 2 h. Then the mixture is cooled down and applied to a sieve. The phthalimidomethylated bead polymer is washed with water.

Volume yield: 2320 ml
Dry weight: 0.4911 gram per ml
Nitrogen content: 5.6% by weight based on the total amount of the phthalimidomethylated bead polymer 1.4 Preparation of an Aminomethylated Heterodisperse Macroporous Bead Polymer 1380 grams of demineralized water and 1190 grams of 50% by weight aqueous sodium hydroxide solution are initially charged at room temperature.

2296 ml of phthalmidomethylated bead polymer from 1.3 are metered into the initial charge. The suspension is heated in an autoclave to 180'C for 2 hours with stirring and stirred at this temperature for a further 8 hours. After cooling, the suspension is applied to a sieve. The resultant aminomethylated bead polymer is washed with demineralized water.
Volume yield: 1640 ml
Dry weight: 0.3376 gram per ml
HCl number: 2.65 mol/liter of resin Example 2

2.1 Preparation of the Monodisperse Macroporous Bead Polymer Based on Styrene, Divinylbenzene and Ethylstyrene A 10 l glass reactor is initially charged with 3000 g of deionized water, and a solution of 10 g of gelatin, 16 g of disodium hydrogenphosphate dodecahydrate and 0.73 g of resorcinol in 320 g of deionized water is added and mixed in. The mixture is brought to 25° C. Subsequently, while stirring, a mixture of 3200 g of microencapsulated monomer droplets having a narrow particle size distribution, composed of 3.6% by weight of divinylbenzene and 0.9% by weight of ethylstyrene (used in the form of a commercial isomer mixture of divinylbenzene and ethylstyrene with 80% divinylbenzene), 0.5% by weight of dibenzoyl peroxide, 56.2% by weight of styrene and 38.8% by weight of isododecane (technical isomer mixture having a high proportion of pentamethylheptane) is given, the microcapsule consisting of a formaldehyde-hardened complex coacervate composed of gelatin and a copolymer of acrylamide and acrylic acid, and 3200 g of aqueous phase having a pH of 12 are added.

The mixture is stirred and polymerized to completion by increasing the temperature in accordance with a temperature program beginning at 25° C. and ending at 95° C. The mixture is cooled, washed over a 32 µm sieve and then dried at 80° C. under reduced pressure. This gives 1893 g of a polymer in bead form.

2.2 Preparation of a Phthalimidomethylated Heterodisperse Macroporous Bead Polymer 598 g of acetic acid, 441 g of acetoxymethylolphthalimide and 157 g of bead polymer from Example 2.1 are initially charged, heated to 60° C. and stirred at this temperature for 1 h. Subsequently, 143.1 g of FeCl₃ are added and the mixture is stirred at 0.5 h. Thereafter, the temperature is increased to 110° C. and the mixture is stirred at this temperature for 10 h. The mixture is cooled down to 60° C., 360 g of acetic acid are added and the mixture is applied to a sieve. Washing is effected once more with 360 g of acetic acid at 60° C., and the mixture is applied to a sieve and washed with demineralized water.
Volume yield: 1010 ml
Nitrogen content 5.9%

2.2 Preparation of an Aminomethylated Heterodisperse Macroporous Bead Polymer 988 ml of phthalimidomethylated bead polymer are hydrolysed analogously to Example 1.4.

Volume yield: 720 ml
HCl number: 2.27 mol/l
Aminomethylated resin—amount of base/grams of bead polymer. 10.4

Summary of Results

| Parameter | In the presence of a swelling agent (1,2-dichloroethane) as per U.S. Pat. No. 3,989,650 Example 5 | No swelling agent |
|---|---|---|
| Yield of aminomelthylafed resin in ml per gram of bead polymer | 3.6 | 3.68 |
| Aminomethyleted resin—HCl number in mol/l | 2.4 | 2.65 |
| Aminomethylated resin—amount of base/grams of bead polymer | 8.64 | 9.76 |
| Conversion level of the phthalimide used to aminomethylated groups in % | 64.8 | 75.8 |

The process claimed therefore allows, without use of swelling agents, higher yields of aminomethylated bead polymer to be obtained than is known from U.S. Pat. No. 3,989,650.

What is claimed is:

1. A process for preparing aminomethylated bead polymers, the process comprising:
   a) converting monomer droplets composed of a mixture comprising at least one monovinylaromatic compound, at least one polyvinylaromatic compound, and at least one initiator to a bead polymer;
   b) reacting the bead polymer from step a) with N-carboxymethylphthalimide in the presence of aliphatic saturated or unsaturated carboxylic anhydrides or carboxylic acids or in the presence of mixtures of aliphatic saturated or unsaturated carboxylic anhydrides and at least one aliphatic saturated or unsaturated carboxylic add, and
   in the presence of at least one Friedel-Crafts catalyst, to give a phthalimidomethylated bead polymer, and the amount of the compounds used:
   N-carboxymethylphthalimide, bead polymer, aliphatic, saturated or unsaturated carboxylic anhydrides or carboxylic acids or mixtures thereof and Friedel-Crafts catalysts collectively in the reaction mixture is greater than 80% by weight, based on the total amount of the reaction mixture, and
   c) hydrolyzing the phthalimidomethylated bead polymer to give an aminomethylated bead polymer.

2. The process according to claim 1, wherein the monovinylaromatic compounds are styrene, α-methylstyrene, vinyltoluene, ethylstyrene, t-butylstyrene, chlorostyrene, bromostyrene, chloromethylstyrene, or vinylnaphthalene, or mixtures of these compounds.

3. Process according to claim 1, wherein the polyvinylaromatic compounds are divinylbenzene, divinyltoluene, or trivinylbenzene, or mixtures of these compounds.

4. The process according to claim 1, wherein the monovinylaromatic compound is styrene and the polyvinylaromatic compound is divinylbenzene.

5. The process according to claim 1, wherein the N-carboxymethylphthalimide is N-acetoxymethylphthalimide.

6. The process according to claim 1, wherein the Friedel-Crafts catalysts are a mixture of iron(III) chloride and sulphuric acid.

7. The process according to claim 1, further comprising using 2 to 5 mol of N-carboxymethylphthalimide per mole of Friedel-Crafts catalyst.

8. The process according to claim 1, further comprising using $10^{-3}$ mol to 0.03 mol of N-carboxymethylphthalimide per gram of bead polymer.

9. The process according to claim 1, further comprising using N-carboxymethylphthalimides in an amount of 1.6 to 2.5 mol per mole of carboxylic anhydrides or carboxylic acid.

10. The Process according to claim 1, wherein the carboxylic anhydrides and carboxylic acids are a mixture of acetic anhydride and acetic acid.

11. The process according to claim 10, wherein a ratio of acetic anhydride to acetic acid is 3:1 to 10:1.

12. The process according to claim 1, further comprising collectively using the N-carboxymethylphthalimide compounds, the bead polymer, the carboxylic anhydrides or carboxylic acids or mixtures thereof, and the Friedel-Crafts catalysts in an amount greater than 95% by weight in the reaction mixture, based on the total amount of the reaction mixture.

13. The process according to claim 1, further comprising conducting process step c) with aqueous or alcoholic solutions of an alkali metal hydroxide at temperatures between 100° C. and 250° C.

14. The process according to claim 1, further comprising using a porogen in step a).

15. The process according to claim 1, wherein the carboxylic acid is acetic acid.

* * * * *